US012716391B1

(12) United States Patent
Clark et al.

(10) Patent No.: US 12,716,391 B1
(45) Date of Patent: Aug. 25, 2026

(54) CASE COUPLED ELECTRIC MACHINE(S) FOR AIRCRAFT POWERPLANT

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/095,889

(22) Filed: Mar. 31, 2025

(51) Int. Cl.

| | |
|---|---|
| ***F02C 7/32*** | (2006.01) |
| ***F01D 15/10*** | (2006.01) |
| ***F02C 7/36*** | (2006.01) |

(52) U.S. Cl.
CPC .................. *F02C 7/32* (2013.01); *F02C 7/36* (2013.01); *F01D 15/10* (2013.01); *F05D 2220/76* (2013.01); *F05D 2260/4031* (2013.01)

(58) Field of Classification Search
CPC ... F02C 7/32; F02C 7/36; F01D 15/10; B64D 27/33; B64D 31/16; B64D 31/18; F05D 2220/76; F05D 2260/4031
See application file for complete search history.

(56) References Cited

U.S. PATENT DOCUMENTS 4,118,997 A * 10/1978 Woodward ............. F01D 15/12 74/417
4,497,171 A * 2/1985 Corrigan ............... F01D 17/167 415/151
5,349,814 A * 9/1994 Ciokajlo ................. F02C 7/275 60/788
5,694,765 A * 12/1997 Hield ...................... F02C 3/113 60/39.163
5,867,979 A * 2/1999 Newton .................. F02C 3/113 310/90.5
7,481,062 B2 * 1/2009 Gaines ................ F16H 37/0826 60/793
7,997,085 B2 * 8/2011 Moniz ..................... F01D 25/34 60/788
8,097,972 B2 1/2012 Macchia
8,146,370 B2 * 4/2012 Zeiner ....................... F02C 9/18 60/778
8,278,774 B2 10/2012 Macchia
8,966,911 B2 * 3/2015 Ress, Jr. ................. F02C 7/275 60/788
9,121,351 B2 * 9/2015 Ress, Jr. ................... F02K 3/06
(Continued)

*Primary Examiner* — William H Rodriguez
(74) *Attorney, Agent, or Firm* — Getz Balich LLC

(57) ABSTRACT

An aircraft assembly includes an engine core, a core case, a nacelle structure, a core compartment, a first electric machine and a first driveshaft. The engine core includes a first rotating structure rotatable about a first axis and that includes a first structure rotor. The core case is radially outboard of and houses the engine core. The nacelle structure is radially outboard of and covers the core case. The core compartment is disposed radially between and is formed by the core case and the nacelle structure. The first electric machine is disposed in the core compartment. The first electric machine includes a first machine rotor and a first machine case. The first machine case houses the first machine rotor. The first machine case is connected to and projects out from a section of the core case. The first drivetrain operatively couples the first machine rotor to the first rotating structure.

20 Claims, 7 Drawing Sheets

(56) References Cited

U.S. PATENT DOCUMENTS

| | | | | |
|---|---|---|---|---|
| 9,200,592 | B2 * | 12/2015 | Berryann | F02K 3/04 |
| 9,548,639 | B2 * | 1/2017 | Goi | H02K 7/1823 |
| 10,570,824 | B2 * | 2/2020 | Schwarz | F16H 57/0482 |
| 10,934,972 | B2 * | 3/2021 | Hrach | F01D 19/00 |
| 11,041,462 | B2 * | 6/2021 | Kupratis | F02C 7/36 |
| 12,065,973 | B2 | 8/2024 | Kupratis | |
| 2006/0272313 | A1 * | 12/2006 | Eick | F02C 7/275<br>60/39.63 |
| 2008/0148881 | A1 * | 6/2008 | Moniz | F02C 7/32<br>74/15.6 |
| 2009/0290976 | A1 * | 11/2009 | Suciu | F02C 7/32<br>415/122.1 |
| 2013/0247539 | A1 * | 9/2013 | Hoppe | F02C 7/32<br>60/39.15 |
| 2016/0376023 | A1 * | 12/2016 | Ullyott | F01C 11/008<br>290/52 |
| 2017/0190441 | A1 * | 7/2017 | Mackin | B64D 41/00 |
| 2018/0058243 | A1 * | 3/2018 | Auker | F02C 7/32 |
| 2022/0082050 | A1 * | 3/2022 | Auker | H02K 5/207 |
| 2023/0272745 | A1 * | 8/2023 | Davis | F01D 25/285<br>29/888.025 |
| 2024/0328363 | A1 * | 10/2024 | Durocher | F02C 3/113 |

* cited by examiner

CASE COUPLED ELECTRIC MACHINE(S) FOR AIRCRAFT POWERPLANT

BACKGROUND OF THE DISCLOSURE

1. Technical Field

This disclosure relates generally to an aircraft powerplant and, more particularly, to an electric machine system for the aircraft powerplant.

2. Background Information

An aircraft powerplant such as an aircraft propulsion system may include one or more electric machines. Various electric machine systems are known in the art. While these known electric machine systems have various benefits, there is still room in the art for improvement.

SUMMARY OF THE DISCLOSURE

According to an aspect of the present disclosure, an assembly is provided for an aircraft. This aircraft assembly includes an engine core, a core case, a nacelle structure, a core compartment, a first electric machine and a first drive-shaft. The engine core includes a compressor section, a combustor section, a turbine section, a core flowpath and a first rotating structure. The core flowpath extends through the compressor section, the combustor section and the turbine section. The first rotating structure is rotatable about a first axis and includes a first structure rotor. The first structure rotor is disposed along the core flowpath in the compressor section or the turbine section. The core case extends axially along and circumferentially about the first axis. The core case is radially outboard of and houses the engine core. The nacelle structure extends axially along and circumferentially about the first axis. The nacelle structure is radially outboard of and covers the core case. The core compartment is disposed radially between and is formed by the core case and the nacelle structure. The first electric machine is disposed in the core compartment. The first electric machine includes a first machine rotor and a first machine case. The first machine case houses the first machine rotor. The first machine case is connected to and projects out from a section of the core case. The first drivetrain operatively couples the first machine rotor to the first rotating structure.

According to another aspect of the present disclosure, another assembly is provided for an aircraft. This aircraft assembly includes an engine core, a core case, a nacelle structure, a core compartment, a first electric machine and a first tower shaft. The engine core includes a compressor section, a combustor section, a turbine section, a core flowpath and a first rotating structure. The core flowpath extends through the compressor section, the combustor section and the turbine section. The first rotating structure is rotatable about a first axis and includes a first structure rotor. The first structure rotor is disposed along the core flowpath in the compressor section or the turbine section. The core case extends axially along and circumferentially about the first axis. The core case is radially outboard of and houses the engine core. The nacelle structure extends axially along and circumferentially about the first axis. The nacelle structure is radially outboard of and covers the core case. The core compartment is disposed radially between the core case and the nacelle structure. The first electric machine is disposed in the core compartment. The first electric machine includes a first machine rotor and a first machine case. The first machine case houses the first machine rotor. The first tower shaft operatively couples the first machine rotor to the first rotating structure. The first tower shaft is coaxial with the first machine rotor.

According to still another aspect of the present disclosure, another assembly is provided for an aircraft. This aircraft assembly includes an engine core, a first electric machine, a first tower shaft, a second electric machine and a second tower shaft. The engine core includes a compressor section, a combustor section, a turbine section, a core flowpath, a first rotating structure and a second rotating structure. The core flowpath extends through the compressor section, the combustor section and the turbine section. The first rotating structure is rotatable about a first axis and includes a first structure rotor. The first structure rotor is disposed along the core flowpath in the compressor section or the turbine section. The second rotating structure is rotatable about the first axis and includes a second structure rotor. The second structure rotor is disposed along the core flowpath in the compressor section or the turbine section. The first electric machine includes a first machine rotor that is rotatable about a first machine axis. The first tower shaft operatively couples the first machine rotor to the first rotating structure. The first tower shaft is coaxial with the first machine rotor. The second electric machine includes a second machine rotor that is rotatable about a second machine axis. The second machine axis is angularly offset from the first machine axis about the first axis. The second tower shaft operatively couples the second machine rotor to the second rotating structure. The second tower shaft is coaxial with the second machine rotor.

The first machine case may be formed integral with a section of the core case disposed along the compressor section.

The first machine case may be mechanically fastened to a section of the core case disposed along the compressor section.

The first machine case may be formed integral with the section of the core case.

The first machine case may be mechanically fastened to the section of the core case.

The section of the core case may at least partially house the compressor section.

The compressor section may include a first compressor section and a second compressor section disposed between the first compressor section and the combustor section along the core flowpath. The section of the core case may be configured as an intermediate casing disposed between the first compressor section and the second compressor section along the core flowpath.

The first machine rotor may be rotatable about a second axis. The second axis may be angularly offset from the first axis by an acute offset angle.

The first machine rotor may be rotatable about a second axis. The second axis may be perpendicular to the first axis.

The first drivetrain may be configured as or otherwise include a first tower shaft. The first machine rotor may be coaxial with the first tower shaft.

The first drivetrain may be configured as or otherwise include a first tower shaft. The first tower shaft may be mounted to the first machine rotor by one or more fasteners.

The first drivetrain may be configured as or otherwise include a first tower shaft. The first tower shaft may be mounted to the first machine rotor by splined coupling.

The first electric machine may also include a first machine stator and a first machine cover. The first machine stator and the first machine rotor may be disposed in an interior of the first machine case. The first machine cover may be attached to the first machine case and may cover an opening to the interior of the first machine case.

The first electric machine may also include a first machine stator. The first machine stator and the first machine rotor may be disposed in an interior of the first machine case. The first machine stator may circumscribe the first machine rotor and may be fixed to the first machine case.

The first electric machine may be configurable as an electric motor and/or an electric generator. The electric motor may be operable to provide mechanical power to the first rotating structure through the first drivetrain. The electric generator may be operable to receive mechanical power from the first rotating structure through the first drivetrain.

The assembly may also include a second electric machine and a second drivetrain. The second electric machine may be disposed in the core compartment. The second electric machine may include a second machine rotor and a second machine case. The second machine case may house the second machine rotor. The second machine case may be connected to and may project out from the core case. The second drivetrain may operatively couple the second machine rotor to a second rotating structure of the engine core. The second rotating structure may include a second structure rotor. The second structure rotor disposed along the core flowpath in the compressor section or the turbine section.

The first machine rotor may be rotatable about a second axis. The second machine rotor may be rotatable about a third axis. The third axis may be angularly offset from the second axis about the first axis by an offset angle equal to or greater than sixty degrees.

The first machine rotor may be rotatable about a second axis. The second machine rotor may be rotatable about a third axis. The third axis may be axially aligned with the second axis along the first axis.

The assembly may also include a propulsor rotor. The engine core may be configured to drive rotation of the propulsor rotor.

The assembly may also include an inner housing structure and an outer housing structure. The inner housing structure may include the core case and the nacelle structure. The outer housing structure may extend axially along and circumferentially about the first axis. The outer housing structure may be spaced radially outboard from the nacelle structure with a bypass flowpath radially between the nacelle structure and the outer housing structure. The outer housing structure may be radially outboard of and may house the propulsor rotor.

The propulsor rotor may be configured as or otherwise include an open rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
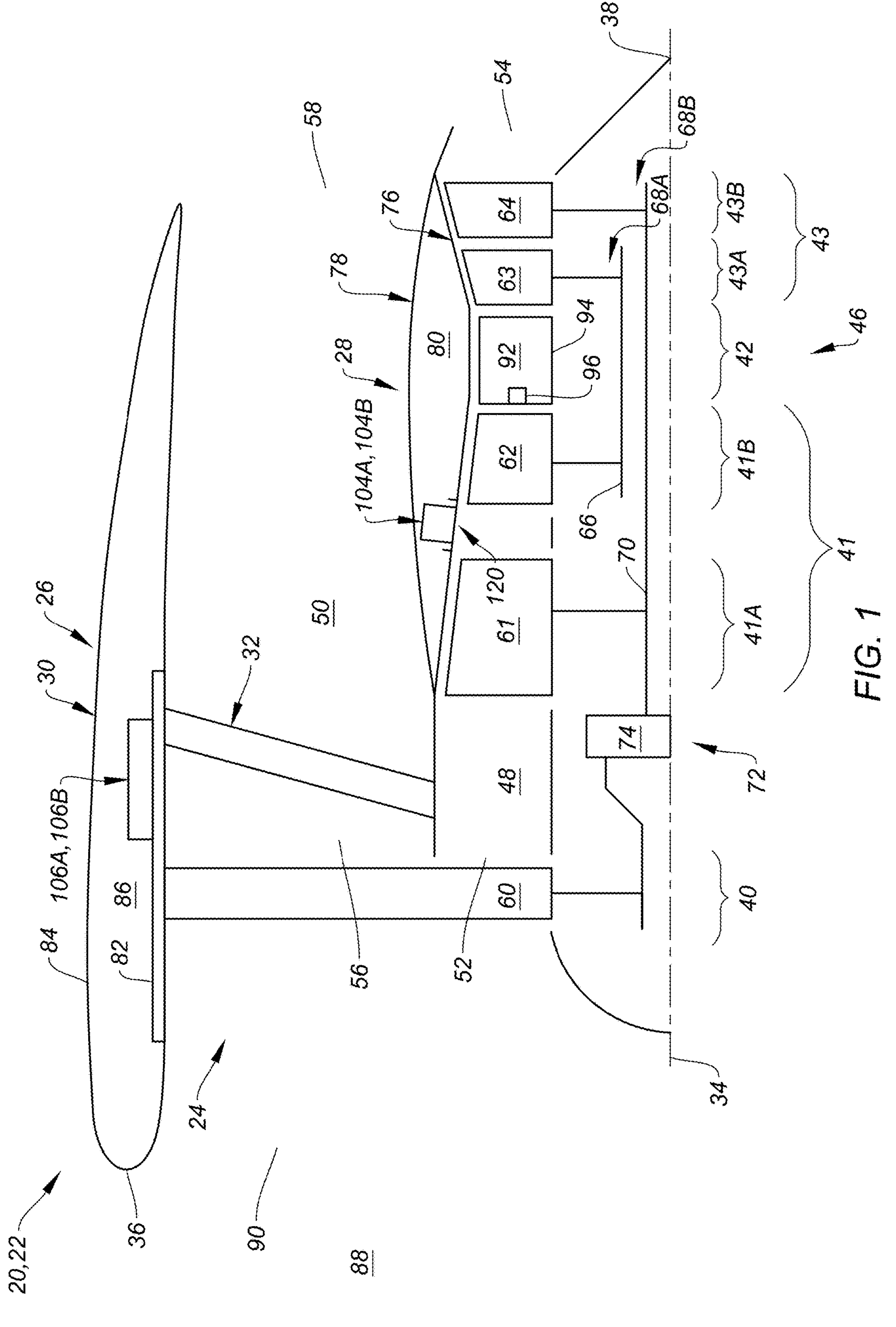
FIG. 1 is a partial schematic illustration of an aircraft propulsion system.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary housing structure 26, which housing structure 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 extends axially along a propulsion system axis 34 between an axial upstream, forward end 36 of the aircraft propulsion system 22 and an axial downstream, aft end 38 of the aircraft propulsion system 22. Briefly, the propulsion system axis 34 may be a centerline axis of the aircraft propulsion system 22, the turbine engine 24 and/or one or more of its members. The propulsion system axis 34 may also or alternatively be a rotational axis for one or more members of the turbine engine 24.

The aircraft propulsion system 22 and its turbine engine 24 of FIG. 1 include a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. At least (or only) the LPC section 41A, the HPC section 41B, the combustor section 42, the HPT section 43A and the LPT section 43B collectively form a core 46 (e.g., a gas generator) of the turbine engine 24. The aircraft propulsion system 22 and its turbine engine 24 of FIG. 1 also include a core flowpath 48 (e.g., an annular core flowpath) and a bypass flowpath 50 (e.g., an annular bypass flowpath). The core flowpath 48 extends sequentially through the LPC section 41A, the HPC section 41B, the combustor section 42, the HPT section 43A and the LPT section 43B from an airflow inlet 52 into the core flowpath 48 to a combustion products exhaust 54 out from the core flowpath 48. The bypass flowpath 50 extends through a bypass duct from an airflow inlet 56 into the bypass flowpath 50 to an airflow exhaust 58 from the bypass flowpath 50, where the bypass duct may be formed by the inner housing structure 28 and the outer housing structure 30. The bypass flowpath 50 and its bypass duct are configured to bypass (e.g., are disposed radially outboard of and extend along) the engine core 46 and the inner housing structure 28.

The propulsor section 40, the LPC section 41A, the HPC section 41B, the combustor section 42, the HPT section 43A and the LPT section 43B may be arranged sequentially along the propulsion system axis 34 within the housing structure 26. The propulsor section 40 includes a bladed propulsor rotor 60; e.g., a fan rotor. The LPC section 41A includes a bladed low pressure compressor (LPC) rotor 61. The HPC section 41B includes a bladed high pressure compressor (HPC) rotor 62. The HPT section 43A includes a bladed high pressure turbine (HPT) rotor 63. The LPT section 43B includes a bladed low pressure turbine (LPT) rotor 64. Each of these engine rotors 60-64 includes a rotor base (e.g., a disk or a hub) and a plurality of rotor blades (e.g., airfoils, vanes, etc.). The rotor blades may be arranged into one or more stages axially along the respective engine rotor 60-64. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 62 is coupled to and rotatable with the HPT rotor 63. The HPC rotor 62 of FIG. 1, for example, is connected to the HPT rotor 63 through a high speed shaft 66. At least (or only) the HPC rotor 62, the HPT rotor 63 and the high speed shaft 66 collectively form a high speed rotating structure 68A; e.g., a high speed spool of the turbine engine 24 and its engine core 46. This high speed rotating structure 68A of FIG. 1 and its members 62, 63 and 66 are rotatable about the propulsion system axis 34. However, it is contemplated the high speed rotating structure 68A may alternatively be rotatable about another axis radially and/or angularly offset from the rotational axis of the propulsor rotor 60 and/or the centerline axis of the turbine engine 24.

The LPC rotor 61 is coupled to and rotatable with the LPT rotor 64. The LPC rotor 61 of FIG. 1, for example, is connected to the LPT rotor 64 through a low speed shaft 70. At least (or only) the LPC rotor 61, the LPT rotor 64 and the low speed shaft 70 collectively form a low speed rotating structure 68B; e.g., a low speed spool of the turbine engine 24 and its engine core 46. This low speed rotating structure 68B of FIG. 1 and its members 61, 64 and 70 are rotatable about the propulsion system axis 34. However, it is contemplated the low speed rotating structure 68B may alternatively be rotatable about another axis radially and/or angularly offset from the rotational axis of the propulsor rotor 60 and/or the centerline axis of the turbine engine 24.

The low speed rotating structure 68B is coupled to the propulsor rotor 60 through a core-to-propulsor drivetrain 72. The core-to-propulsor drivetrain 72 may be configured as a geared drivetrain, where a geartrain 74 (e.g., a transmission, a speed change device, an epicyclic geartrain, etc.) is disposed between and operatively couples the propulsor rotor 60 to the low speed rotating structure 68B and its LPT rotor 64. With this arrangement, the propulsor rotor 60 may rotate at a different (e.g., slower) rotational speed than the low speed rotating structure 68B and its LPT rotor 64. Here, the propulsor rotor 60 and the low speed rotating structure 68B may rotate in a common (the same) direction about the propulsion system axis 34 or in opposite directions about the propulsion system axis 34 depending, for example, upon the specific configuration of the geartrain 74. Alternatively, the core-to-propulsor drivetrain 72 may be configured as a direct-drive drivetrain, where the geartrain 74 is omitted. With such an arrangement, the propulsor rotor 60 rotates at a common (the same) rotational speed as the low speed rotating structure 68B and its LPT rotor 64.

The inner housing structure 28 of FIG. 1 includes an inner case 76 (e.g., a core case) for the turbine engine 24, an inner nacelle structure 78 (e.g., a core nacelle structure such as an inner fixed structure (IFS)) and an internal inner housing compartment 80 (e.g., an engine core compartment). The inner case 76 is disposed radially outboard of, extends axially along and may circumscribe one or more or all of the engine sections 41A-43B and the engine rotors 61-64. The inner case 76 may thereby at least partially or completely house and provide a support structure for the respective engine sections 41A-43B and the engine rotors 61-64. A barrel of the inner nacelle structure 78 is disposed radially outboard of, extends axially along and extends circumferentially about at least a portion of the inner case 76. This inner nacelle structure 78 is configured to provide an aerodynamic cover over the engine core 46 and its inner case 76. The inner housing compartment 80 of FIG. 1 is formed by and is disposed radially between the inner case 76 and the barrel of the inner nacelle structure 78. The inner housing structure 28 and its inner nacelle structure 78 may also form a radial inner peripheral boundary of the bypass flowpath 50.

The outer housing structure 30 of FIG. 1 includes an outer case 82 (e.g., a fan case) for the turbine engine 24, an outer nacelle structure 84 and an internal outer housing compartment 86. The outer case 82 is disposed radially outboard of, extends axially along and may circumscribe the propulsor section 40 and its propulsor rotor 60. The outer case 82 may thereby house and may be configured as a containment structure for the propulsor section 40 and its propulsor rotor 60. The outer nacelle structure 84 is configured to provide an aerodynamic cover over the outer case 82. The outer housing compartment 86 of FIG. 1 is at least partially formed by and disposed radially between the outer case 82 and an outer portion (e.g., fan cowls) of the outer nacelle structure 84. The outer housing structure 30 and its outer nacelle structure 84 may also form a radial outer peripheral boundary of the bypass flowpath 50.

During operation of the aircraft propulsion system 22 of FIG. 1, ambient air from an environment 88 external to the aircraft and its aircraft propulsion system 22 enters the aircraft propulsion system 22 and its turbine engine 24 through an airflow inlet 90. This air is propelled by the rotating propulsor rotor 60 in a downstream, aft direction towards the propulsion system aft end 38.

An outer stream of the air propelled by the rotating propulsor rotor 60 is directed into the bypass flowpath 50 through its bypass inlet 56, which air entering the bypass flowpath 50 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 58 to provide forward thrust. This propulsion of the bypass air may account for a majority of the forward thrust generated by the aircraft propulsion system 22 and its turbine engine 24 of FIG. 1.

An inner stream of the air propelled by the rotating propulsor rotor 60 is directed into the core flowpath 48 through its core inlet 52, which air entering the core flowpath 48 may be referred to as "core air". This core air is compressed by the LPC rotor 61 and the HPC rotor 62 and is directed into a combustion chamber 92 (e.g., annular combustion chamber) of a combustor 94 (e.g., annular combustor) in the combustor section 42. Fuel is injected into the combustion chamber 92 by one or more fuel injectors 96 and mixed with the compressed core air to provide a fuel-air mixture. This fuel-air mixture is ignited and combustion products thereof flow through and sequentially drive rotation of the HPT rotor 63 and the LPT rotor 64. The rotation of the HPT rotor 63 and the LPT rotor 64 respectively drive rotation of the HPC rotor 62 and the LPC rotor 61 and, thus, compression of the air received from the core inlet 52. The rotation of the LPT rotor 64 also drives rotation of the propulsor rotor 60 through the core-to-propulsor drivetrain 72.

Figure 2:
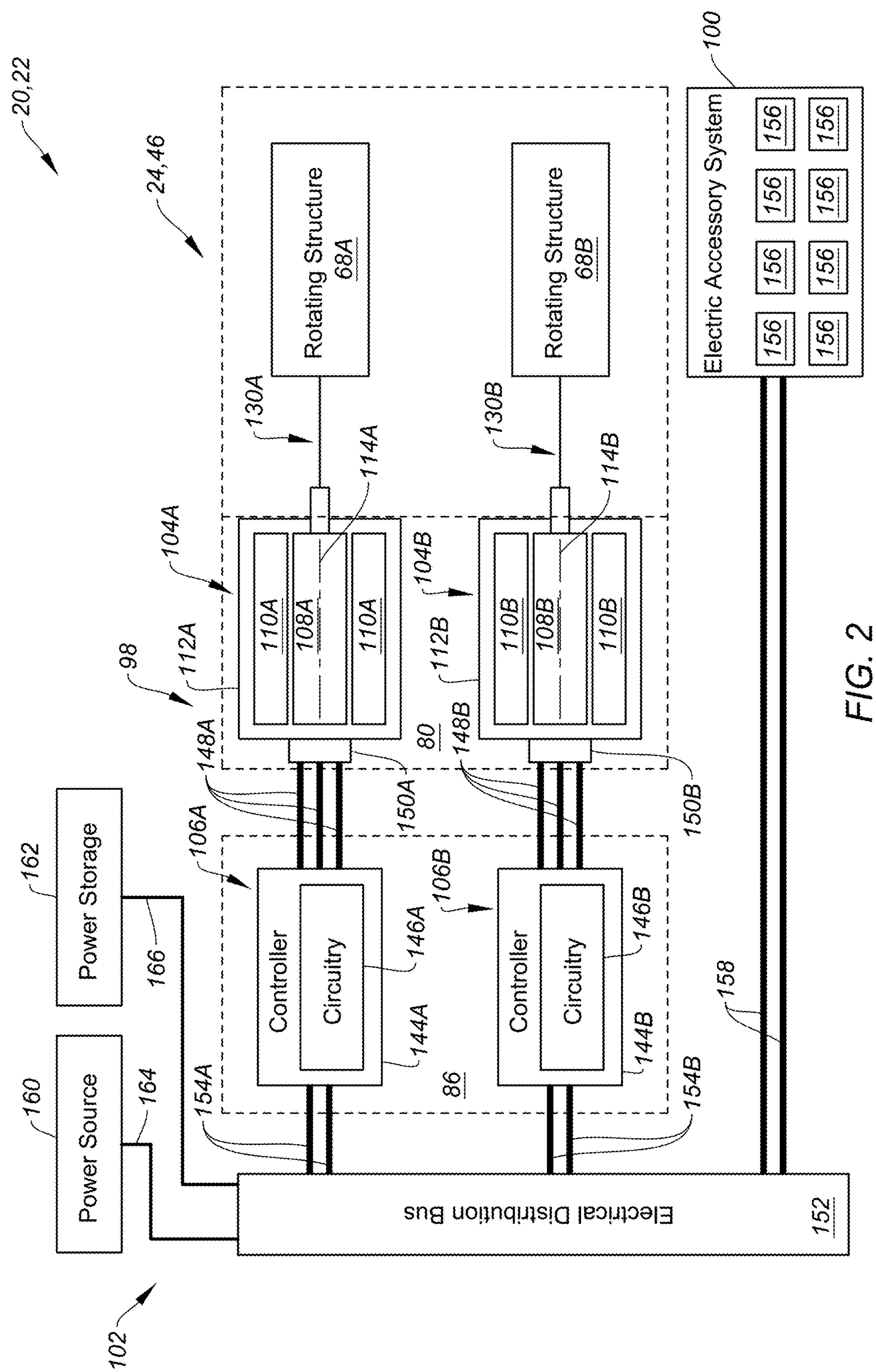
FIG. 2 is a schematic illustration of a portion of the aircraft propulsion system with an electric machine system and an electric accessory system coupled to an aircraft electrical system.

Referring to FIG. 2, the aircraft propulsion system 22 also includes an electric machine system 98 electrically coupled to an electric accessory system 100 and an electrical system 102 for the aircraft and its aircraft propulsion system 22. The electric machine system 98 of FIG. 2 includes one or more electric machines 104A and 104B (generally referred to as "104") and one or more electric machine (EM) controllers 106A and 106B (generally referred to as "106"). For ease of description, each electric machine 104 of FIG. 2 is described below as being electrically coupled to, controlled by and/or otherwise associated with a single, dedicated one of the EM controllers 106. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Figure 3:
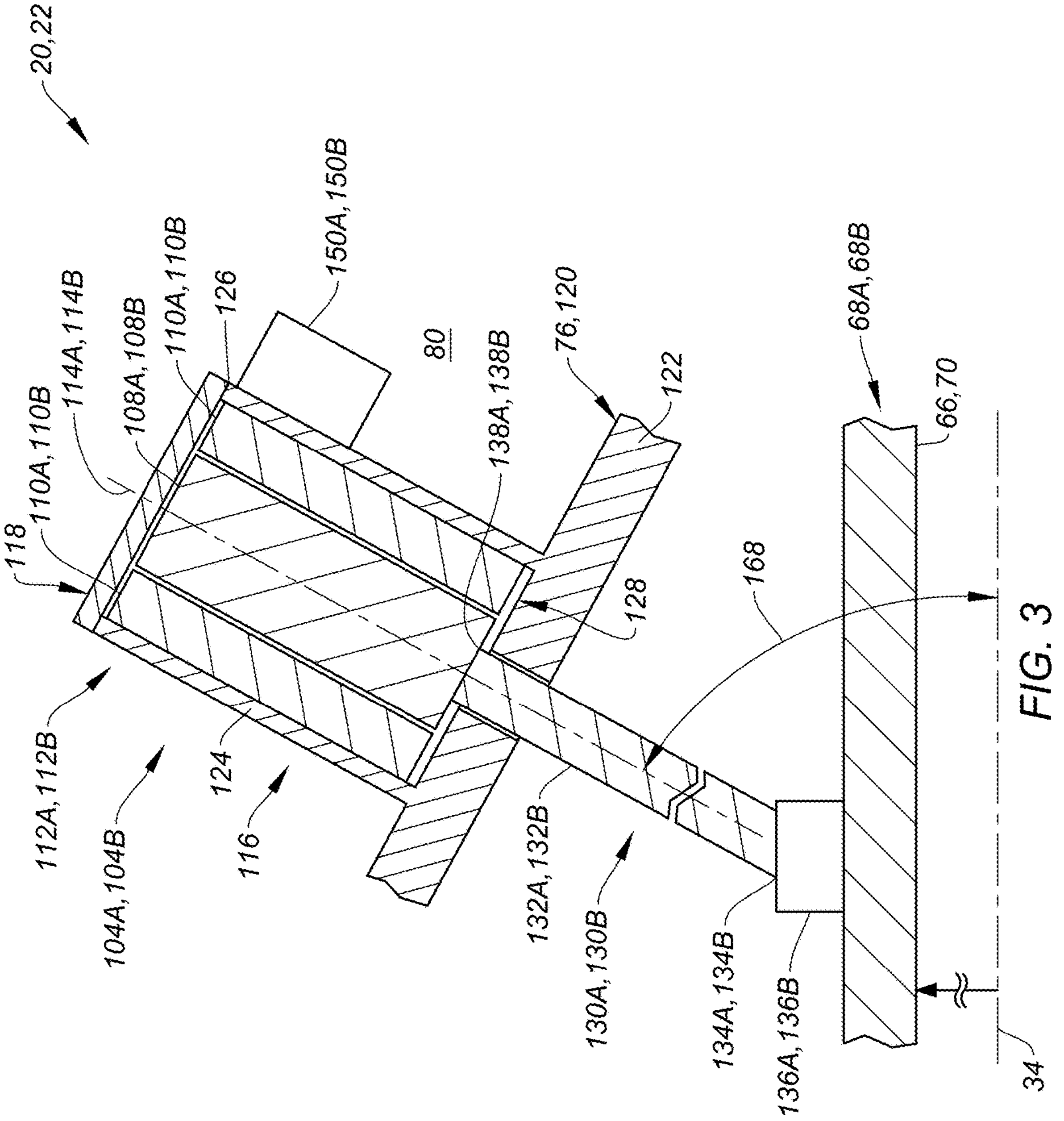
FIG. 3 is a sectional illustration of a portion of the aircraft propulsion system at an electric machine with a case integrated housing.

Referring to FIG. 3, each electric machine 104A, 104B includes an electric machine rotor 108A, 108B (generally referred to as "108"), an electric machine stator 110A, 110B (generally referred to as "110") and an electric machine housing 112A, 112B (generally referred to as "112"). The machine rotor 108A, 108B is rotatable about a machine axis 114A, 114B (generally referred to as "114"). This machine axis 114 is a rotational axis of the machine rotor 108 and may also be an axial centerline of the electric machine 104 and one or more of its members 108, 110 and 112. The machine stator 110 is disposed next to and in electromagnetic communication with the machine rotor 108. The machine stator 110 of FIG. 3, for example, is disposed radially outboard of and circumscribes the machine rotor 108 relative to its machine axis 114. With this arrangement, the electric machine 104 of FIG. 3 is configured as a radial flux electric machine. The electric machines 104 of the present disclosure, however, are not limited to such an exemplary rotor-stator configuration nor to radial flux arrangements.

The electric machine 104 of FIG. 3 and its machine housing 112 are disposed within the inner housing compartment 80. The machine housing 112 of FIG. 3, for example, is disposed next to and radially outboard of (relative to the propulsion system axis 34) the inner case 76. The machine housing 112 of FIG. 3 includes an electric machine case 116 and an electric machine cover 118.

The machine case 116 is connected to a section 120 of the inner case 76. Briefly, this case section 120 may be an axial segment of the inner case 76 formed by a tubular engine casing. The machine case 116 of FIG. 3 is formed integral with a tubular sidewall 122 of the case section 120. The machine case 116, for example, may be cast, machined, additively manufactured and/or otherwise formed with the sidewall 122 of the case section 120 as a monolithic unitary body. In another example, the machine case 116 may be welded, brazed and/or otherwise bonded to the sidewall 122 of the case section 120. The present disclosure, however, is not limited to such an exemplary connection between the machine case 116 and the case section 120. For example, referring to FIG. 4, the machine case 116 may alternatively be mechanically fastened (e.g., bolted) to the sidewall 122 of the case section 120.

A tubular sidewall 124 of the machine case 116 of FIG. 3 projects axially along the machine axis 114 out from the sidewall 122 of the case section 120 to a distal end 126. This case distal end 126 may be a radial outer end of the machine case 116 relative to the propulsion system axis 34. The sidewall 124 of the machine case 116 extends circumferentially about (e.g., completely around) the machine axis 114. With this arrangement, a radial inner side of the sidewall 124 of the machine case 116 forms a radial outer peripheral boundary of an internal volume 128 (e.g., an internal bore) of the machine housing 112. This internal volume 128 projects axially along the machine axis 114 (e.g., generally radially relative to the propulsion system axis 34) into the machine case 116 from the case distal end 126 to (or about) the sidewall 122 of the case section 120.

The machine cover 118 is removably attached to the machine case 116 at its case distal end 126. The machine cover 118, for example, may be mechanically fastened (e.g., bolted and/or clamped) to the sidewall 124 of the machine case 116. The machine cover 118 may be configured as a lid for the machine housing 112 and its machine case 116. The machine cover 118 of FIG. 3, for example, extends across an opening into the internal volume 128 at the case distal end 126. The machine cover 118 may thereby cover (e.g., block off, plug, etc.) the opening into the internal volume 128 such that the internal volume 128 is an enclosed volume within the machine housing 112. Here, the internal volume 128 of FIG. 3 is fluidly isolated from the surrounding inner housing compartment 80.

Figure 4:
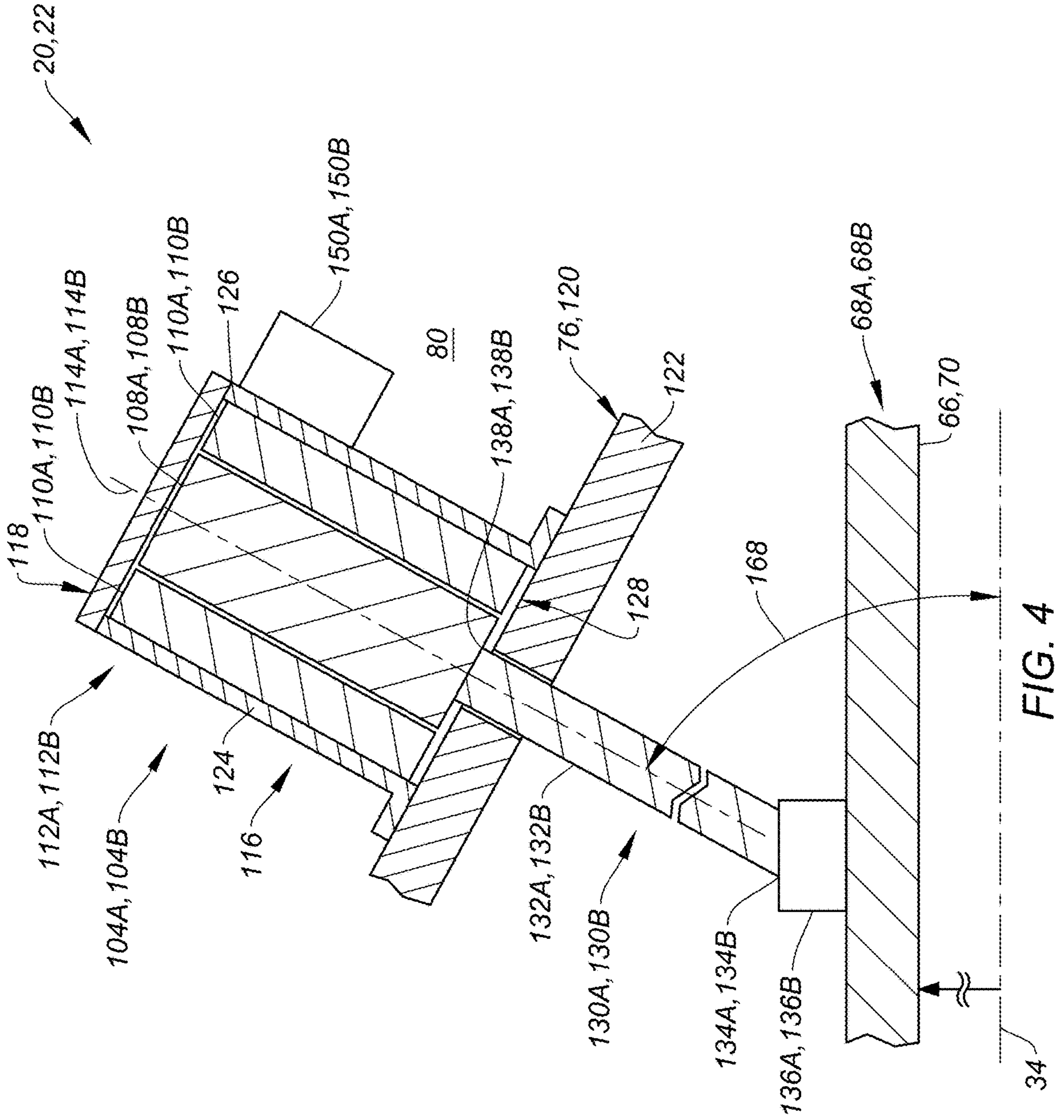
FIG. 4 is a sectional illustration of a portion of the aircraft propulsion system at the electric machine with a case mounted housing.

The machine rotor 108 and the machine stator 110 are housed by and disposed within an interior of the machine housing 112. The machine rotor 108 and the machine stator 110 of FIG. 3, for example, are disposed within the internal volume 128, radially inside the machine case 116 and axially between the sidewall 122 of the case section 120 and the machine cover 118. The machine stator 110 of FIG. 3 is next to and may be fixedly mounted to the sidewall 124 of the machine case 116. The present disclosure, however, is not limited to such an exemplary machine rotor-machine stator arrangement as shown in FIGS. 3 and 4. For example, the machine stator 110 may be indirectly coupled to the machine case 116, fixedly mounted to the machine cover 118 and/or fixedly mounted to the sidewall 122 of the case section 120.

Figures 5, 6:
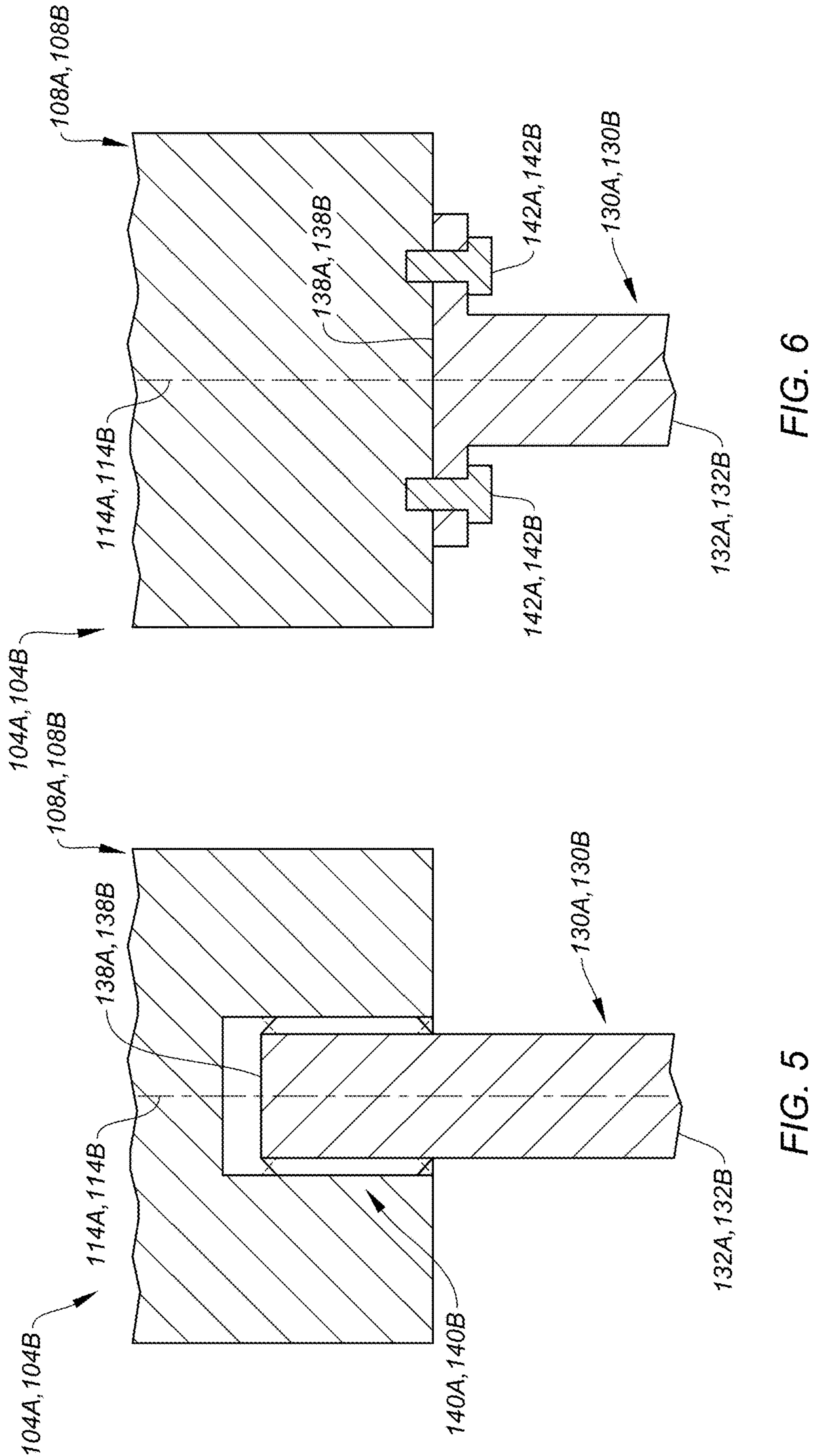
FIG. 5 is a sectional illustration of a splined coupling between a tower shaft and an electric machine rotor.
FIG. 6 is a sectional illustration of a bolted coupling between the tower shaft and the electric machine rotor.

Referring to FIG. 3, each electric machine 104A, 104B is operatively coupled to a respective one of the engine rotating structures 68A, 68B (generally referred to as "68") through a respective core-to-machine drivetrain 130A, 130B (generally referred to as "130"); schematically shown. The core-to-machine drivetrain 130 may be configured as or otherwise include a tower shaft 132A, 132B (generally referred to as "132"). A radial inner end 134A, 134B (generally referred to as "134") of each tower shaft 132A, 132B (relative to the propulsion system axis 34) is coupled to the respective engine rotating structure 68A, 68B through a respective gear system 136A, 136B (generally referred to as "136"), schematically shown. A radial outer end 138A, 138B of each tower shaft 132 (relative to the propulsion system axis 34) is coupled to the respective machine rotor 108A, 108B. For example, the tower shaft 132A, 132B of FIG. 5 is mounted to the respective machine rotor 108A, 108B at the shaft outer end 138A, 138B through a splined coupling 140A, 140B (generally referred to as "140"). In another example, the tower shaft 132A, 132B of FIG. 6 is mounted to the respective machine rotor 108A, 108B at the shaft outer end 138A, 138B by one or more fasteners 142A, 142B (generally referred to as "142"). The present disclosure, however, is not limited to such exemplary mounting techniques between the tower shaft 132 and the respective engine rotating structure 68 and/or the respective machine rotor 108. Moreover, it is contemplated each core-to-machine drivetrain 130 may also include additional components such as, but not limited to, a clutch system. Referring again to FIG. 3, each electric machine 104 and its machine rotor 108 may be arranged coaxial with the respective tower shaft 132 operatively coupled thereto.

Referring to FIG. 2, each electric machine 104 may be configurable as an electric motor and/or an electric generator; e.g., an electric motor-generator. For example, during a motor mode of operation, a respective electric machine 104 may operate as the electric motor to convert electricity received from the aircraft electrical system 102. The machine stator 110, for example, may generate an electromagnetic field with the machine rotor 108 using a current of electricity received from the aircraft electrical system 102 through the respective EM controller 106. This electromagnetic field may drive rotation of the machine rotor 108. The machine rotor 108, in turn, may provide mechanical power to and drive rotation of the respective engine rotating structure 68 through the respective core-to-machine drivetrain 130. This mechanical power may be provided to boost power or completely power the rotation of the respective engine rotating structure 68. By contrast, during a generator mode of operation, the electric machine 104 may operate as the electric generator to convert mechanical power received from the respective engine rotating structure 68 into electricity. Rotation of the machine rotor 108, for example, may be rotationally driven by rotation of the respective engine rotating structure 68 through the respective core-to-machine drivetrain 130. The rotation of the machine rotor 108 may generate an electromagnetic field with the machine stator 110, and the machine stator 110 may convert energy from the electromagnetic field into electricity. The respective electric machine 104 may then provide a current of electricity to the aircraft electrical system 102 through the respective EM controller 106 for storage and/or further use. The electric machines 104 of the present disclosure, however, are not limited to such exemplary operation. For example, one, some or all of the electric machines 104 may alternatively each be configured as a dedicated electric generator; e.g., without the electric motor functionality. One, some or all of the electric machines 104 may alternatively each be configured as a dedicated electric motor; e.g., without the electric generator functionality.

Each EM controller 106A, 106B includes a controller housing 144A, 144B (generally referred to as "144") and internal controller circuitry 146A, 146B (generally referred to as "146"). The controller housing 144 may be configured as an enclosed case (e.g., a closed or sealed container) for the respective controller circuitry 146. The controller circuitry 146 is disposed within an interior of the controller housing 144; e.g., an internal chamber or other volume(s) within and enclosed by the controller housing 144. The controller circuitry 146 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 106A, 106B is electrically coupled to a respective one of the electric machines 104A, 104B through one or more electric cables 148A, 148B (generally referred to as "148"); e.g., high voltage electric cables, power feeder cables, etc. More particularly, the controller circuitry 146 of each EM controller 106 is electrically coupled to the respective electric machine 104 and its machine stator 110 through the respective electric cables 148. Briefly, the electric cables 148 may be electrically coupled to the respective electric machine 104 through a respective terminal junction box 150A, 150B (generally referred to as "150") (see also FIG. 3). Each EM controller 106 of FIG. 2 is electrically coupled to an electrical distribution bus 152 of the aircraft electrical system 102 through one or more electric cables 154A, 154B (generally referred to as "154"); e.g., high voltage electric cables, power feeder cables, etc. More particularly, the controller circuitry 146 of each EM controller 106 is electrically coupled to the aircraft electrical system 102 and its electrical distribution bus 152 through the respective electric cables 154.

Each EM controller 106 and its controller circuitry 146 are configured to control operation of a respective one of the electric machines 104. For example, when operating as the electric motor, the respective EM controller 106 and its controller circuitry 146 are configured to regulate a flow of electricity from the aircraft electrical system 102 to the respective electric machine 104. This electricity flow regulation may include: (a) turning-on the flow of electricity from the aircraft electrical system 102 to the respective electric machine 104 (e.g., electrically coupling the respective electric machine 104 to the aircraft electrical system 102); (b) turning-off the flow of electricity from the aircraft electrical system 102 to the respective electric machine 104 (e.g., electrically decoupling the respective electric machine 104 from the aircraft electrical system 102); (c) moderating the flow of electricity from the aircraft electrical system 102 to the respective electric machine 104. Here, the respective EM controller 106 operates as a motor controller. In another example, when operating as the electric generator, the respective EM controller 106 and its controller circuitry 146 are configured to regulate a flow of electricity from the respective electric machine 104 to the aircraft electrical system 102. This electricity flow regulation may include: (a) turning-on the flow of electricity from the respective electric machine 104 to the aircraft electrical system 102 (e.g., electrically coupling the respective electric machine 104 to the aircraft electrical system 102); (b) turning-off the flow of electricity from the respective electric machine 104 to the aircraft electrical system 102 (e.g., electrically decoupling the respective electric machine 104 from the aircraft electrical system 102); (c) moderating the flow of electricity from the respective electric machine 104 to the aircraft electrical system 102. Here, the respective EM controller 106 operates as a generator controller.

The EM controllers 106 may be disposed within the outer housing compartment 86. Each EM controller 106 of FIG. 1, for example, is located radially outboard of and next to the outer case 82, and each EM controller 106 and its controller housing 144 is mounted to the outer case 82. This mounting of the respective EM controller 106 to the outer case 82 may be a direct mounting or an indirect mounting through an intermediate mounting structure. Of course, it is contemplated one or more of the EM controllers 106 may alternatively be located elsewhere within the aircraft propulsion system 22 or even outside of the aircraft propulsion system 22; e.g., in a pylon structure for the aircraft propulsion system 22.

Referring to FIG. 2, the electric accessory system 100 includes one or more electric devices 156. The electric devices 156 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 156 of FIG. 2 may be configured as part of one or more sub-systems for the aircraft propulsion system 22 and its turbine engine 24. Examples of these sub-systems include, but are not limited to: a fuel system for delivering the fuel to the fuel injectors 96 (see FIG. 1); a lubrication system for delivering lubricant (e.g., oil) to one or more lubricated components (e.g., bearing(s), gear system(s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices 156.

Each electric device 156 is electrically coupled to the electrical distribution bus 152 of the aircraft electrical system 102 through one or more electric cables 158 (collectively schematically shown); e.g., high voltage electric cables, low voltage electric cables, power feeder cables, etc. Each electric device 156 may thereby receive a current of electricity from the aircraft electrical system 102 to power operation thereof.

The aircraft electrical system 102 includes the electrical distribution bus 152. This aircraft electrical system 102 may also include a power source 160 and/or a power storage 162. The electrical distribution bus 152 is electrically coupled to each of the electric machines 104 through their respective EM controllers 106. The electrical distribution bus 152 is electrically coupled to each of the electric devices 156. The electrical distribution bus 152 is also electrically coupled to the power source 160 and the power storage 162, schematically shown via lines 164 and 166 respectively. Of course, the electrical distribution bus 152 may also be electrically coupled to one or more additional electric components of the aircraft propulsion system 22 and/or one or more additional electric components of the aircraft outside of the aircraft propulsion system 22; e.g., airframe mounted electric components, etc. With this arrangement, the electrical distribution bus 152 provides an intermediate connection between the various electrical members 104A (via 106A), 104B (via 106B), 156, 160 and/or 162. The power source 160 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 162 is configured to receive electricity from the electrical distribution bus 152 for storage. The power storage 162 is also configured to provide the stored electricity to the electrical distribution bus 152. The power storage 162, for example, may be configured as or otherwise include one or more electricity storage devices; e.g., batteries, super capacitors, etc. With the foregoing aircraft electrical system arrangement, the electrical current provided to one, some or all of the electric devices 156 may be received, through the electrical distribution bus 152, from any one, some or all of the electrical aircraft propulsion system members 104A (via 106A), 104B (via 106B), 160 and/or 162. It is also contemplated the electrical current provided to one of the electric machines 104 may be received from another one of the electric machines 104 through the aircraft electrical system 102 and its electrical distribution bus 152.

Figure 7:
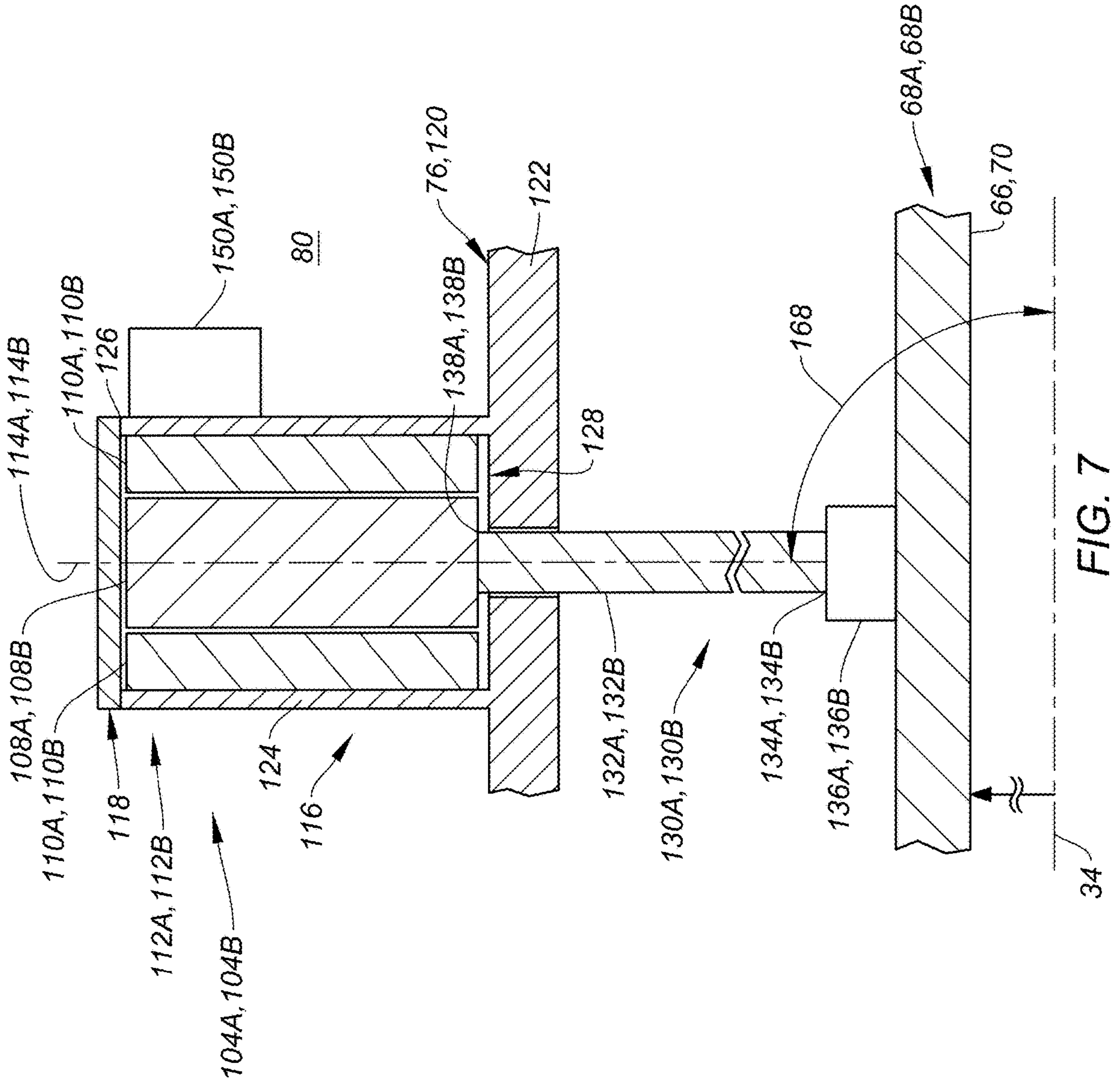
FIG. 7 is a sectional illustration of a portion of the aircraft propulsion system at the electric machine with another orientation.

In some embodiments, referring to FIG. 3, the machine axis 114 of each electric machine 104 may be angularly offset from the propulsion system axis 34 by an offset angle 168. In some embodiments, the offset angle 168 may be a non-zero acute angle equal to or greater than, for example, thirty degrees (30°) or forty-five degrees (45°). In other embodiments, referring to FIG. 7, the offset angle 168 may be ninety degrees (90°) such that the respective machine axis 114 is perpendicular to the propulsion system axis 34.

Figure 8:
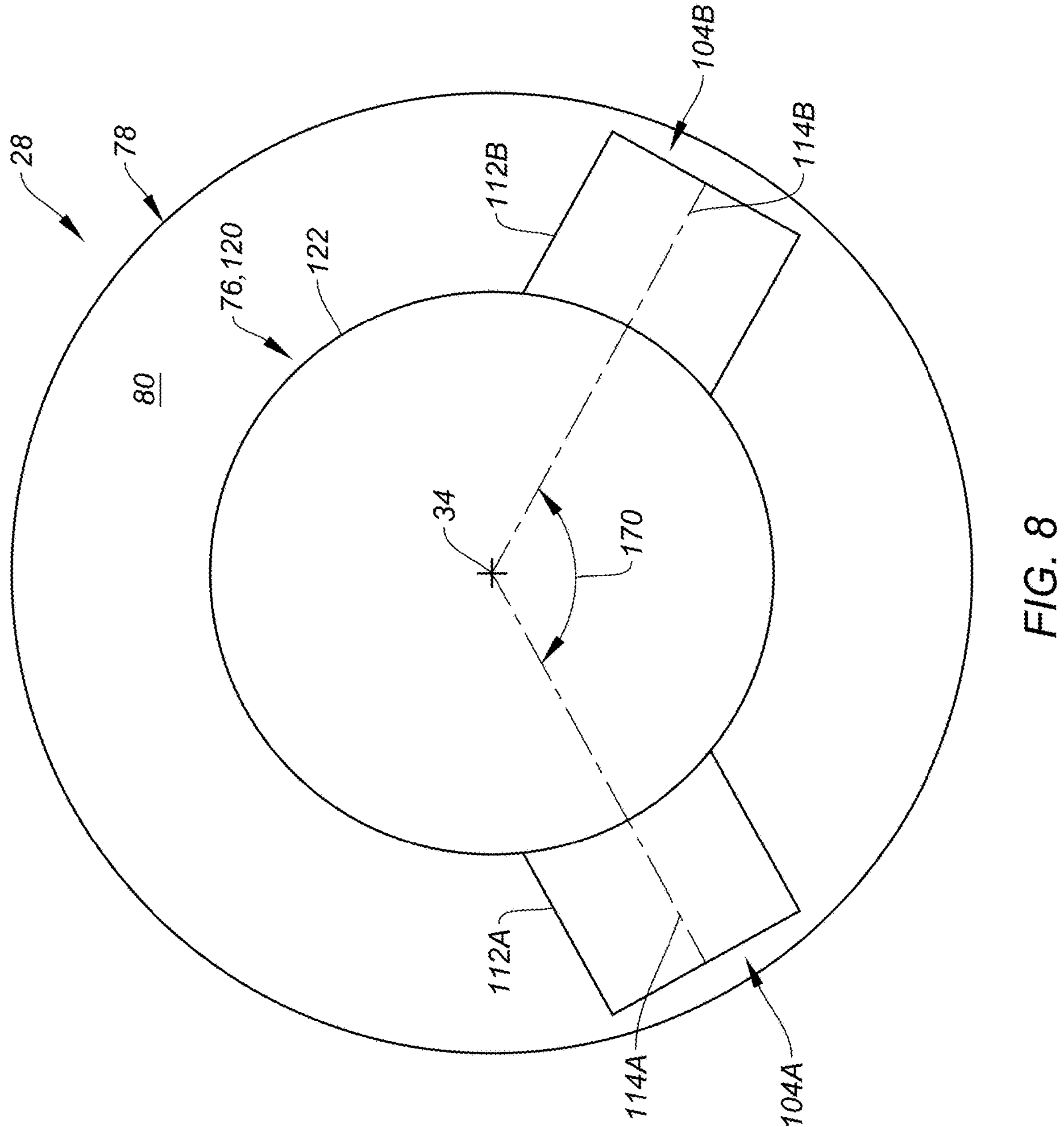
FIG. 8 is a schematic cross-sectional illustration of multiple electric machines arranged within a compartment of a housing structure.

In some embodiments, referring to FIG. 8, the electric machines 104A, 104B may be circumferentially offset about the engine core 46 and its inner case 76. The electric machines 104A, 104B may also be axially aligned along the engine core 46 and its inner case 76. For example, the machine axes 114A, 114B of FIG. 8 are angularly offset about the propulsion system axis 34 by an offset angle 170. This offset angle 170 may be equal to or greater than forty-five degrees (45°) or sixty degrees (60°). In FIG. 8, the offset angle 170 is shown as being less than one-hundred and eighty degrees (180°). In other embodiments, however, it is contemplated the electric machines 104A, 104B and their machine axes 114A, 114B may be diametrically opposed; e.g., the offset angle 170 may be one-hundred and eighty degrees (180°). In addition, while the machine axes 114A, 114B of FIG. 8 are axially aligned along the propulsion system axis 34, it is contemplated the electric machines 104A, 104B and their machine axes 114A, 114B may alternatively be axially offset along the propulsion system axis 34.

In some embodiments, referring to FIG. 1, each electric machine 104 and the case section 120 may be disposed along the compressor section 41. The case section 120 of FIG. 1, for example, may be configured as an intermediate case (e.g., an inter-compressor case) longitudinally between the LPC section 41A and the HPC section 41B along the core flowpath 48. The present disclosure, however, is not limited to such an exemplary arrangement.

With the arrangements described above, the aircraft propulsion system 22 of FIG. 1 may be configured without an accessory gearbox operatively coupled to the low speed rotating structure 68B and/or the high speed rotating structure 68A. Rather, accessories for the aircraft propulsion system 22 may be electric devices and electrically powered through the aircraft electrical system 102 (see FIG. 2). The accessories for the aircraft propulsion system 22, for example, may be included in the electric devices 156 of FIG. 2. By omitting an accessory gearbox, complexity and/or size of the aircraft propulsion system 22 may be reduced. Of course, in other embodiments, it is contemplated the aircraft propulsion system 22 may alternatively include an accessory gearbox operatively coupling one or more accessories to the low speed rotating structure 68B and/or the high speed rotating structure 68A.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:

an engine core including a compressor section, a combustor section, a turbine section, a core flowpath and a first rotating structure, the core flowpath extending through the compressor section, the combustor section and the turbine section, the first rotating structure rotatable about a first axis and comprising a first structure rotor, and the first structure rotor disposed along the core flowpath in the compressor section or the turbine section;

a core case extending axially along and circumferentially about the first axis, the core case radially outboard of and housing the engine core;

a nacelle structure extending axially along and circumferentially about the first axis, the nacelle structure radially outboard of and covering the core case;

a core compartment disposed radially between and formed by the core case and the nacelle structure;

a first electric machine disposed in the core compartment, the first electric machine including a first machine rotor and a first machine case, the first machine case housing the first machine rotor, and the first machine case connected to and projecting out from a section of the core case; and a first drivetrain operatively coupling the first machine rotor to the first rotating structure;

wherein the first machine rotor is rotatable about a second axis, and the second axis is angularly offset from the first axis by an acute offset angle.

2. The assembly of claim 1, wherein the first machine case is formed integral with the section of the core case.

3. The assembly of claim 1, wherein the first machine case is mechanically fastened to the section of the core case.

4. The assembly of claim 1, wherein the section of the core case at least partially houses the compressor section.

5. The assembly of claim 1, wherein the compressor section includes a first compressor section and a second compressor section disposed between the first compressor section and the combustor section along the core flowpath; and the section of the core case is configured as an intermediate casing disposed between the first compressor section and the second compressor section along the core flowpath.

6. The assembly of claim 1, wherein the first drivetrain comprises a first tower shaft; and the first tower shaft is mounted to the first machine rotor by one or more fasteners.

7. The assembly of claim 1, wherein the first drivetrain comprises a first tower shaft; and the first tower shaft is mounted to the first machine rotor by splined coupling.

8. The assembly of claim 1, wherein the first electric machine further includes a first machine stator;

the first machine stator and the first machine rotor are disposed in an interior of the first machine case; and the first machine stator circumscribes the first machine rotor and is fixed to the first machine case.

9. The assembly of claim 1, wherein the first electric machine is configurable as at least one of an electric motor operable to provide mechanical power to the first rotating structure through the first drivetrain; or an electric generator operable to receive mechanical power from the first rotating structure through the first drivetrain.

10. The assembly of claim 1, further comprising:

a second electric machine disposed in the core compartment, the second electric machine including a second machine rotor and a second machine case, the second machine case housing the second machine rotor, and the second machine case connected to and projecting out from the core case; and a second drivetrain operatively coupling the second machine rotor to a second rotating structure of the engine core;

the second rotating structure comprising a second structure rotor, and the second structure rotor disposed along the core flowpath in the compressor section or the turbine section.

11. The assembly of claim 10, wherein the first machine rotor is rotatable about a second axis;

the second machine rotor is rotatable about a third axis; and the third axis is angularly offset from the second axis about the first axis by an offset angle equal to or greater than sixty degrees.

12. The assembly of claim 10, wherein the first machine rotor is rotatable about a second axis;

the second machine rotor is rotatable about a third axis; and the third axis is axially aligned with the second axis along the first axis.

13. The assembly of claim 1, further comprising:

a propulsor rotor;

the engine core configured to drive rotation of the propulsor rotor.

14. The assembly of claim 13, further comprising:

an inner housing structure including the core case and the nacelle structure; and an outer housing structure extending axially along and circumferentially about the first axis, the outer housing structure spaced radially outboard from the nacelle structure with a bypass flowpath radially between the nacelle structure and the outer housing structure, and the outer housing structure radially outboard of and housing the propulsor rotor.

15. An assembly for an aircraft, comprising:

an engine core including a compressor section, a combustor section, a turbine section, a core flowpath and a first rotating structure, the core flowpath extending through the compressor section, the combustor section and the turbine section, the first rotating structure rotatable about a first axis and comprising a first structure rotor, and the first structure rotor disposed along the core flowpath in the compressor section or the turbine section;

a core case extending axially along and circumferentially about the first axis, the core case radially outboard of and housing the engine core;

a nacelle structure extending axially along and circumferentially about the first axis, the nacelle structure radially outboard of and covering the core case;

a core compartment disposed radially between and formed by the core case and the nacelle structure;

a first electric machine disposed in the core compartment, the first electric machine including a first machine rotor and a first machine case, the first machine case housing the first machine rotor, and the first machine case connected to and projecting out from a section of the core case; and a first drivetrain operatively coupling the first machine rotor to the first rotating structure;

wherein the first drivetrain comprises a first tower shaft; and wherein the first machine rotor is coaxial with the first tower shaft.

16. The assembly of claim 15, wherein the first machine rotor is rotatable about a second axis; and the second axis is perpendicular to the first axis.

17. The assembly of claim 15, wherein the first machine rotor is rotatable about a second axis; and the second axis is angularly offset from the first axis by an acute offset angle.

18. An assembly for an aircraft, comprising:

an engine core including a compressor section, a combustor section, a turbine section, a core flowpath and a first rotating structure, the core flowpath extending through the compressor section, the combustor section and the turbine section, the first rotating structure rotatable about a first axis and comprising a first structure rotor, and the first structure rotor disposed along the core flowpath in the compressor section or the turbine section;

a core case extending axially along and circumferentially about the first axis, the core case radially outboard of and housing the engine core;

a nacelle structure extending axially along and circumferentially about the first axis, the nacelle structure radially outboard of and covering the core case;

a core compartment disposed radially between and formed by the core case and the nacelle structure;

a first electric machine disposed in the core compartment, the first electric machine including a first machine rotor and a first machine case, the first machine case housing the first machine rotor, and the first machine case connected to and projecting out from a section of the core case; and a first drivetrain operatively coupling the first machine rotor to the first rotating structure;

wherein the first electric machine further includes a first machine stator and a first machine cover;

wherein the first machine stator and the first machine rotor are disposed in an interior of the first machine case; and wherein the first machine cover is attached to the first machine case and covers an opening to the interior of the first machine case.

19. The assembly of claim 18, wherein the first machine rotor is rotatable about a second axis; and the second axis is perpendicular to the first axis.

20. The assembly of claim 18, wherein the first machine rotor is rotatable about a second axis; and the second axis is angularly offset from the first axis by an acute offset angle.

* * * * *